Figure 1:
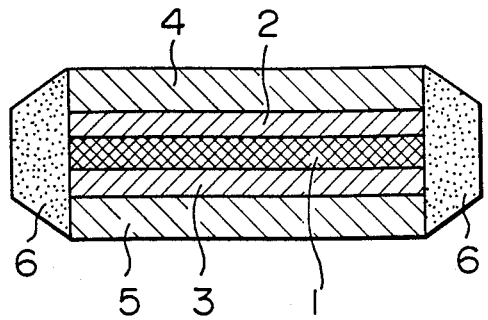

United States Patent [19]

Kondo et al.

[11] Patent Number: 4,810,599

[45] Date of Patent: Mar. 7, 1989

[54] STRUCTURE SUITABLE FOR SOLID ELECTROCHEMICAL ELEMENTS

[75] Inventors: Shigeo Kondo, Hirakata; Naoshi Yasuda; Masaki Nagata, both of Yokohama; Tadashi Sotomura, Kashiwara, all of Japan

[73] Assignees: Japan Synthetic Rubber Co., Ltd., Tokyo; Matsushita Electric Industrial Co., Ltd., Osaka, both of Japan

[21] Appl. No.: 172,166

[22] Filed: Mar. 23, 1988

[30] Foreign Application Priority Data

Mar. 27, 1987 [JP] Japan ................................. 62-73730
Mar. 27, 1987 [JP] Japan ................................. 62-73728
Nov. 5, 1987 [JP] Japan ............................... 62-279881

[51] Int. Cl.$^4$ ............................................. H01M 6/18
[52] U.S. Cl. ................................. 429/191; 429/193; 429/199; 429/212; 361/501
[58] Field of Search ............... 429/191, 193, 199, 218, 429/101, 212, 217; 361/433; 307/109

[56] References Cited

U.S. PATENT DOCUMENTS

| | | | |
|---|---|---|---|
| 3,701,686 | 10/1972 | Argue et al. ........................ | 429/191 |
| 3,837,920 | 9/1974 | Liang et al. ........................ | 429/191 |
| 4,060,672 | 11/1977 | Von Alpen et al. .................. | 429/191 |
| 4,258,109 | 3/1981 | Liang et al. ........................ | 429/191 |
| 4,367,267 | 1/1983 | Oi ...................................... | 429/101 |
| 4,404,268 | 9/1983 | Imai et al. .......................... | 429/191 |

Primary Examiner—Anthony Skapars
Attorney, Agent, or Firm—Spencer & Frank

[57] ABSTRACT

A structure comprising a pair of electrode sheets and an electrolyte sheet, the latter being sandwiched in between the former, wherein each of the pair of electrode sheets comprises a mixture comprising an insulating elastomer and an electrode active substance powder and/or an inorganic solid electrolyte powder, in which mixture the electrode active substance powder and/or the inorganic solid electrolyte powder are dispersed in a volume fraction of 75–95% in the insulating elastomer, and said electrolyte sheet comprises a mixture of an inorganic solid electrolyte powder and an insulating elastomer and optionally an electrode active substance powder, in which mixture the inorganic solid electrolyte powder and optionally the electrode active substance powder are dispersed in a volume fraction of 55–95% in the insulating elastomer. Each of said electrode sheet and said electrolyte sheet may further comprise a reticulate material sheet, the openions of which are filled with the mixture. The structure is excellent in ion-conductivity, processability, productivity, storage stability and flexibility and enables one to make solid electrolyte cells, solid electric double layer capacitors and solid electrochromic display thinner and larger in area.

18 Claims, 1 Drawing Sheet

STRUCTURE SUITABLE FOR SOLID ELECTROCHEMICAL ELEMENTS

This invention relates to a structure suitable for use in a solid electrochemical element, and more particularly, to a structure which is utilized in a solid cell, a solid electric double layer capacitor, a solid electrochromic display and the like.

The technical progress in electronic industry in recent years is remarkable and electronic components such as IC, LSI and the like are much used in almost all fields. Such a technical progress is also seen in the field of cell technique and an attempt has been made to render cells smaller and thinner. Such cells are in use in large amounts as a power source of card-shaped portable claculator, camera, wrist watch, etc.

Most of the cells used in the above applications are alkali cells or lithium cells, and a liquid electrolyte is used therein. These cells using a liquid electrolyte requires a high degree of sealing technique, and there is currently employed a sealing technique in which crimp seal via a gasket is used. In this sealing technique, however, the thinner the cells, the larger the proportion of a sealing material occupying the cell volume, which makes it difficult to provide a required cell capacity. Therefore, there is a limitation in making cells thinner.

Under such circumstances, research is being conducted on a solid electrolyte having a high ion-conductivity in order to make cells smaller and thinner.

As to the solid electrolyte, polyelectrolytes have been tried to be applied and a typical example thereof is a poly(oligooxyethylene methacrylate)-alkali metal salt system. However, the ion-conductivity thereof is at best about $10^{-5}$ s/cm at room temperature and said system is inferior in selectivity of movable ion and causes the movement of not only cation (e.g. $Li^+$) but also anion (e.g. $ClO_4^-$). Therefore, said system has not been used in practice.

Moreover, an attempt has recently been made to utilize lithium ion-conductive solid electrolytes, proton-conductive solid electrolytes, silver ion-conductive solid electrolytes and copper ion-conductive solid electrolytes, all of which have a large ion-conductivity.

A typical example of the lithium ion-conductive solid electrolyte is $0.4LiSiO_4-0.6Li_3VO_4$, typical examples of the proton-conductive solid electrolyte are $H_3Mo_{12}PO_{40}.29H_2O$ and $H_3W_{12}PO_{40}.29H_2O$, a typical example of the silver ion-conductive electrolyte is $RbAg_4I_5$ and a typical example of the copper ion-conductive solid electrolyte is $RbCu_4I_{1.5}Cl_{3.5}$. However, these solid electrolytes and electrode active substances are inorganic solid powders, and therefore, require pelletization by high pressure pressing in the production thereof. This is a great obstacle in achieving high productivity and uniformity. Further, the pellets obtained are hard and brittle, and there is a limit in making cells thinner and it is difficult to produce a cell having a large surface area. Also, in the production of cells, it is necessary to apply a great pressure in the working of adhering the solid electrolyte to an electrode active material. Therefore, there is a problem of the workability, adhesion and the like being not constant. Moreover, there are other problems that when it is intended to adhere a large area no uniform adhesion is obtained and the solid electrolyte is broken.

An object of this invention is to solve the above-mentioned problems of the prior art and provide a structure which can make cells thinner, and is suitable for use in solid electrochemical elements and excellent in processability and productivity in the fabrication of cells and the like.

Figure 2:
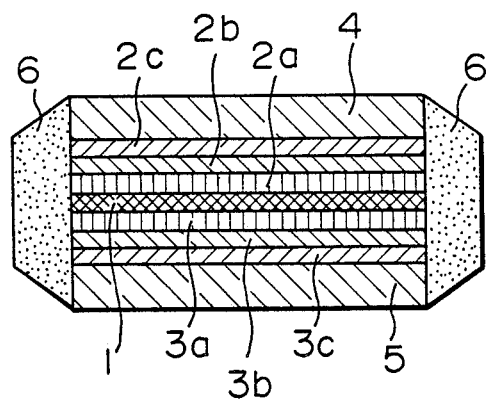

Other objects and advantages of this invention will become apparent from the following description and the accompanying drawings. In the drawings, FIG. 1 is a cross section of a solid electrolyte cell obtained in Example 1 which appears hereinafter and FIG. 2 is a cross section of a solid electrolyte cell obtained in Example 2 which appears hereinafter. In FIGS. 1 and 2, 1 refers to an electrolyte sheet, 2 to a positive electrode sheet I, 2a to a positive electrode sheet layer I-D, 2b to a positive electrode sheet layer I-E, 2c to a positive electrode sheet layer I-F, 3 to a negative electrode sheet I, 3a to a negative electrode sheet layer I-A, 3b to a negative electrode sheet layer I-B, 3c to a negative electrode sheet layer I-C, 4 and 5 to collective electrodes and 6 to a sealing material.

According to this invention, there is provided a structure comprising a pair of electrode sheets and an electrolyte sheet, said electrolyte sheet being sandwiched in between the pair of electrode sheets, wherein each of the pair of electrode sheets is composed of a mixture comprising an insulating elastomer and an electrode active substance powder alone or in combination with an inorganic solid electrolyte powder, in which mixture the electrode active substance powder or the combination thereof with an inorganic solid electrolyte powder is dispersed in a volume fraction of 75-95% in the insulating elastomer, and said electrolyte sheet is composed of a mixture comprising an insulating elastomer and an inorganic solid electrolyte powder, in which mixture the inorganic solid electrolyte powder is dispersed in a volume fraction of 55-95% in the insulating elastomer (said structure is hereinafter referred to as Structure I).

This invention further provides another structure comprising a pair of electrode sheets and an electrolyte sheet, the electrolyte sheet being sandwiched in between the pair of electrode sheets, wherein at least one sheet selected from the electrolyte sheet and the electrode sheets comprises a reticulate material sheet, at least the openings of which are filled with a mixture comprising an insulating elastomer and at least one member selected from the group consisting of an electrode active substance powder and an inorganic solid electrolyte powder, provided that in the case of the electrolyte sheet, said reticulate material sheet is non-conductive and said mixture is free of the electrode active substance powder, in which mixture said at least one member is dispersed in the insulating elastomer; when said electrolyte sheet is free of the reticulate material sheet, the electrolyte sheet is composed of a mixture of comprising an insulating elastomer and an inorganic solid electrolyte powder in which mixture the electrolyte powder is dispersed in the insulating elastomer; and when said electrode sheet is free of the reticulate material sheet, the electrode sheet is composed of a mixture comprising an insulating elastomer and an electrode active substance powder alone or in combination with an inorganic solid electrolyte powder in which mixture the electrode active substance powder alone or in combination with an inorganic electrolyte powder is dispersed in the insulating elastomer (said another structure is hereinafter referred to as Structure II).

Each of the Structures I and II of this invention is composed, basically, of an electrolyte sheet (hereinafter referred to as the SE sheet) and a pair of electrode sheets, and is formed by piling up them in the order of one of the electrode sheets, the SE sheet and the other electrode sheet and subjecting the resulting assembly to integral molding. The method of the integral molding is not critical; however, the integral molding can be carried out, for example, by heating the assembly under pressure at a temperature of about 100°-150° C. for a period of more than 10 seconds to about 10 minutes in an inert atmosphere. After the heating under pressure, the assembly may be subjected to heat treatment for 1-3 hours in an inert gas in order to make the adhesion uniform. The structures thus obtained are easy to produce, have a flexibility and a thin shape having a large surface area.

Each of the Structures I and II may be practically used with or without applying collective electrodes onto both sides of the structure and sealing the resulting assembly by a simple sealing technique, such as sealing with a resin, for example, an epoxy resin or the like, or laminate-sealing with a polyethylene film, polypropylene film or the like.

The solid electrolyte powder used in the Structures I and II of this invention includes ion-conductive solid electrolytes, for example, $Li^+$ ion-conductive solid electrolytes such as $LiI$, $LiI\cdot H_2O$, $Li_3N$, $Li_4SiO_4$-$Li_3PO_4$ and the like; $Ag^+$ ion-conductive solid electrodes such as $RbAg_4I_5$, $KAg_4I_5$, $Ag_3SI$, $AgI$-$Ag_2O$-$MgO_3$ glass and the like; $Cu^+$ ion-conductive solid electrolytes such as $RbCu_4I_{2-x}Cl_{3+x}$ ($x$=an arbitrary number of 0.2–0.6), $CuI$-$Cu_2O$-$MoO_3$ glass, $CuI$-$Cu_2O$-$P_2O_5$ glass and the like; $H^+$ ion-conductive solid electrolytes such as $H_3Mo_{12}PO_{40}\cdot 29H_2O$, $H_3W_{12}PO_{40}\cdot 29H_2O$ and the like; $Na^+$ ion-conductive solid electrolytes such as Na-$\beta$-$Al_2O_3$, $Na_{1+a}Zr_2P_{2-a}Si_aO_{12}$ ($a$=an arbitrary number of 0–3) and the like.

The volume fraction of the solid electrolyte powder in the SE sheet used in the Structure I is 55–95%, preferably 75–92%. When the volume fraction of the solid electrolyte powder is less than 55%, the conductivity becomes not more than $10^{-6}$ s/cm and this is not appropriate to practical use. When the conductivity exceeds 95%, the SE sheet obtained in the formation of sheet becomes brittle.

Among the above solid electrolyte powders, preferred are $Cu^+$ ion-conductive solid electrolytes represented by the formula, $RbCu_4I_{2-x}Cl_{3+x}$ ($x$=an arbitrary number of 0.2–0.6) such as $RbCu_4I_{1.75}Cl_{3.25}$, $RbCu_4I_{1.5}Cl_{3.5}$, $RbCu_4I_{1.25}Cl_{3.75}$ and the like which electrolytes have a high ion-conductivity of $10^{-2}$ s/cm at room temperature.

The electrode active substance powder used in the Structures I and II includes carbonaceous materials such as graphite, acetylene black, activated carbon and the like; metal sulfides such as niobium sulfide, molybdenum sulfide, copper sulfide, silver sulfide, lead sulfide, silver Chevrel, copper Chevrel, iron sulfide and the like; metal oxides such as tungsten oxide, vanadium oxide, chromium oxide, molybdenum oxide, titanium oxide, iron oxide, silver oxide, copper oxide and the like; metal halides such as silver chloride, lead iodide, copper iodide and the like; and metals such as copper, silver, lithium, gold, platinum, titanium, alloys of these metals, stainless steel and the like, and these are appropriately selected depending upon the purposes of application of the Structures I and II. Among these electrode active substances, substances which can electrochemically give ions to and receive ions from the solid electrolyte, for example, $CuTiS_2$, $Cu_xZrS_2$, $Ag_xTiS_2$, $Ag_xZrS_2$, $Li_xWO_3$, $Li_xTiS_2$, $WO_3$, $V_2O_5$, $HWO_3$, $Cu_xMo_6S_{8-y}$ and the like are suitable for positive electrode sheets of solid electrolyte secondary cells. Substances which can electrochemically give ions to and receive ions from the solid electrolyte to undergo optical change, for example, $WO_3$ and the like are suitable for the electrode sheet of a solid electrochromic display. Substances which do not give ions to or receive ions from the solid electrolyte but can form an electric double layer at the interface between the electrode active substance and the solid electrolyte, for example, activated carbon and the like are appropriate for the electrode sheet of a solid double layer capacitor.

When for the purpose of preventing the over-discharge from being cuased when the Structure I or II of this invention is used as the solid electrolyte secondary cell, Cu powder or Ag powder, for example, is used in a negative electrode sheet, it is preferable to add $Cu_2S$ powder or $Ag_2S$ powder to the Cu powder or the Ag powder, respectively, in a proportion of Cu (or Ag)-:$Cu_2S$ (or $Ag_2S$)=8:2–6.5:4.5 by weight.

The electrode sheet contains an electrode active substance powder alone or in combination with the solid electrolyte powder. In order to reduce the interfacial resistance between the electrode sheet and the SE sheet and facilitate the movement of charges at the interface, it is preferable for the electrode sheet to contain the electrode active substance powder in combination with the solid electrolyte powder. When the electrode sheet contains both the electrode active substance powder and the solid electrolyte powder, the weight ratio of the electrode active substance powder/the solid electrolyte powder is preferably ¼ to 5/4.

In the Structure I of this invention, both the electrode active substance powder and the solid electrolyte powder are preferably used in the electrode sheet, and the volume fraction of the combination of the solid electrolyte powder and the electrode active substance powder in the insulating elastomer in the electrode sheet is 75–95%. When the volume fraction is less than 75%, the contact efficiency with the solid electrolyte powder in the SE sheet becomes low and satisfactory characteristics as electrochemical element are not obtained. When the volume fraction exceeds 95%, the electrode sheet obtained is brittle and it is impossible to keep the sheet form. Also, for the same reason as mentioned above as to the Structure I, in the Structure II, too, it is preferable that the volume fraction of the combination of the solid electrolyte powder and the electrode active substance powder in the insulating elastomer in the electrode sheet is 75–95%.

In this invention, the shape and particle diameter of the solid electrolyte powder and the electrode active substance powder used are not critical, though it is preferable in view of facilitating dispersing them in the insulating elastomer that the powders can pass through a 100–200-mesh (Tyler) screen.

The insulating elastomer used in the Structures I and II of this invention includes, for example, 1,4-polybutadiene, natural rubber, polyisoprene, styrene-butadiene rubber (SBR), acrylonitrile-butadiene rubber (NBR), ethylene-propylene copolymer (EPM), ethylene-propylene-diene terpolymer (EPDM), urethane rubber, polyester rubber, chloroprene rubber, epichlorohydrin rubber, silicone rubber, styrene-butadiene-styrene block copolymer (hereinafter referred to as "SBS"), styrene-isoprene-styrene block copolymer (hereinafter referred to as "SIS"), styrene-ethylenebutylene-styrene block copolymer (hereinafter referred to as "SEBS"), styrene-ethylene-propylene block copolymer (hereinafter referred to as "SEP"), butyl rubber, phosphazene rubber, polyethylene, polypropylene, poly(ethylene oxide), poly(propylene oxide), polystyrene, poly(vinyl chloride), ethylene-vinyl acetate copolymer, 1,2-polybutadiene, epoxy resin, phenolic resin, cyclized polybutadiene, cyclized polyisoprene, poly(methyl methacrylate) and mixtures thereof. It is preferable that the insulating elastomer contain at least 50% by volume of an insulating elastomer having no unsaturation, for example, SEBS, SEP, polyethylene, polypropylene, poly(ethylene oxide), polystyrene, poly(vinyl chloride), ethylene-vinyl acetate copolymer and the like. In order to obtain a good adhesion between the sheets and between the sheets and collective electrodes, it is preferable that the insulating elastomer be thermoplastic, and in order to obtain a satisfactory flexibility, it is also preferable for the elastomer to have an ASTM A hardness of not more than 95. Also, the elastomer is preferably processable at a temperature of not more than 150° C. in view of the heat resistance of the solid electrolyte powder.

As a part of the Structure I or II of this invention, there may be used the SE sheet formed from a uniform dispersion of the solid electrolyte powder and other optional additives in an insulating high polymeric elastomer (hereinafter referred to as the SE Sheet I) and an electrode sheet formed from a uniform dispersion of an electrode active substance powder alone or in combination with the solid electrolyte powder and other optional additives in an insulating elastomer (hereinafter referred to the Electrode Sheet I), and these may be produced by the following method, though it is not critical:

The insulating elastomer is kneaded with the solid electrolyte powder or the electrode active substance powder alone or a combination of the electrode active substance powder and the solid electrolyte powder, together with other optional additives by means of, for example, a Banbury mixer, and the resulting mixture is rolled into a sheet, or alternatively, the insulating elastomer is dissolved in a solvent, the resulting solution is kneaded with the solid electrolyte powder or the electrode active substance powder alone or a combination of the solid electrolyte powder and the electrode active substance powder, together with other optional additives, in a ball mill or the like, and the resulting mixture is pressed by means of an applicator bar or the like into a sheet which is then dried preferably in an inert gas atmosphere. In particular, the latter method is preferred for the following reasons: (1) It is easy to obtain a thin film of not more than 100 μm in thickness having substantially no unevenness in thickness. (2) The amount of heat generated during the kneading is small, and hence, the deterioration and decomposition of the solid electrolyte powder during the kneading are difficult to cause. (3) Moreover, there is only a small change of the mixture being contacted with the atmosphere and hence the deterioration and decomposition of the solid electrolyte powder due to moisture, oxygen or the like are difficult to cause during the kneading. The solvent used in this case is preferably a non-hygroscopic solvent which does not react with the solid electrolyte powder such a n-hexane, n-heptane, n-octane, cyclohexane, benzene, toluene, xylene, ethyl acetate, trichloroethylene, or the like. In this case, the insulating elastomer is preferably 1,4-polybutadiene, natural rubber, polyisoprene, SBR, NBR, SBS, SIS, SEBS, SEP, butyl rubber, phosphazene rubber, poly(ethylene oxide), polystyrene, 1,2-polybutadiene or the like which is soluble in said solvent.

The solid electrolyte sheet used in the Structure II of this invention which is formed by filling at least the openings of a reticulate material sheet with a dispersion of the solid electrolyte powder and optionally other additives in the insulating elastomer (hereinafter referred to as the SE Sheet II), in which the volume fraction of the solid electrolyte powder in the dispersion is preferably 55-95%, particularly preferably 75-92%, or the electrode sheet used in the Structure II which is formed by filling at least the openings of a reticulate material sheet with a dispersion of the electrode active substance powder alone or in combination with the solid electrolyte powder or the solid electrolyte powder alone and optionally other additives in the insulating elastomer (hereinafter referred to as the Electrode Sheet II), in which the volume fraction of the electrode active substance powder alone or in combination with the solid electrolyte powder in the dispersion is preferably 75-95% and the volume fraction of the solid electrolyte powder alone in the dispersion is preferably 55-95%, can be prepared, for example, by immersing the reticulate material in a slurry in a solvent of the mixture prepared by dispersing the solid electrolyte powder or the electrode active substance powder alone or a combination of the two and optionally other additives in the insulating elastomer to allow the mixture to adhere sufficiently to the reticulate material, subjecting the mixture-adhering reticulate material to treatment with a pair of blades, rolls or the like which are made of a hard rubber, plastic, metal or the like to fill at least the openings of the reticulate material sheet with the mixture and simultaneously remove the excessive mixture from the reticulate material sheet. In this case, the solids concentration of the mixture in the slurry is preferably 50-80% by weight.

After the openings of the reticulate material sheet is filled with the mixture in the above manner, the reticulate material sheet is dried at a temperature of, for example, 20°-30° C., preferably in an inert gas atmosphere to obtain the SE sheet II or the Electrode Sheet II which can be used in the Structure II of this invention.

Incidentally, each of these sheets may have a layer of the mixture in a thickness of 5-25 μm on one side or both sides of the reticulate material sheet for enhancing the adhesion, for example, between the SE Sheet and the Electrode Sheet, and also increase the conductivity, polarization and the capacity of these sheets.

According to the above method, the SE sheet or the electrode sheet obtained can have a very high precision in thickness, and the sheets can be prepared continuously.

The reticulate material sheet used in the Electrode Sheet II may be made of, for example, a non-conductive substance such as cellulose, nylon 6, nylon 66, polypropylene, polyethylene, silica, alumina, glass or the like; a conductive substance such as a conductive carbon such as activated carbon or a conductive metallic substance such as copper, nickel, titanium, stainless steel or the like. In the Electrode Sheet II, a conductive reticulate material can act as the electrode active substance. In the SE Sheet II, the reticulate material sheets made of the non-conductive substance selected from the above-mentioned reticulate material sheets are used. Specific examples of the reticulate material sheet include woven and nonwoven fabrics of the above-mentioned substances. The proportion of the openings of the reticulate material sheet is preferably 35-65%, and the proportion is determined by the total area of the openings per unit area of the reticulate material sheet. When the proportion is less than 35%, the SE Sheet II obtained has a low conductivity and the Electrode Sheet II obtained has too large a polarization. When the proportion exceeds 65%, it becomes difficult to maintain the necessary strength for the SE Sheet II and the Electrode Sheet II. Moreover, the specific surface area of the reticulate material sheet is preferably 50-1,000 m$^2$/g. In the case of nonwoven fabric, its weight per unit area is preferably 5-50 g/m$^2$, and the thickness of the reticulate material sheet is preferably 10-150 $\mu$m for the non-conductive reticulate material sheet or 30-300 $\mu$m for the conductive reticulate material sheet, considering the strength of the reticulate material sheet itself and the purpose of making the Structure II thinner. The average area per one opening is preferably $1.6 \times 10^{-3} - 9 \times 10^{-2}$ mm$^2$ and the distance between every adjacent openings is preferably 20-120$\mu$.

The solid electrolyte powder and the insulating elastomer contained in the SE Sheets I and II and the Electrode Sheets I and II may be common or different between the SE sheet and the electrode sheet. However, in view of the homogeneousness of the shaped article and adhesion between the SE sheet and the electrode sheet and other aspects, they are preferably common between the SE sheet and the electrode sheet. Also, the thickness of the SE sheet is preferably 10-250 $\mu$m, and the thickness of the electrode sheet is preferably 20-400 $\mu$m, more preferably 20-250 $\mu$m.

In the Structures I and II of this invention, the electrode sheet is composed preferably of a laminate of a plurality of layers of mixtures of the solid electrolyte powder and the electrode active substance powder at different mixing ratios which are varied stepwise and the layers constituting the laminate are arranged in the order of the mixing ratios so that the layer having the largest mixing ratio of the solid electrolyte powder is contacted with the SE sheet. In this case, the number of the layers constituting the laminate of the electrode sheet is not critical, and it is preferably 3 to 9 though a double layer laminate can have an effect. However, the number of sheets is more preferably 3 to 6 in view of the complexity of processing and avoidance of the formation of too thick an electrode sheet. When the electrode sheet is composed of a laminate of layers of the mixtures, the interfactial resistance between the electrode sheet and the SE sheet is reduced and the current capacity can be increased. When the reticulate material sheet is contained in the multi-layer electrode sheet, this electrode sheet is dealt with as the Electrode Sheet II.

In the Structure II, it is sufficient that the SE sheet or one of the electrode sheets has a reticulate material sheet. Preferably, the SE sheet and one of the electrode sheets have a reticulate material sheet.

In order to increase the bonding strength between the SE Sheet I and the Electrode Sheet I or II or between the SE sheet II and the Electrode Sheet I or II, the mixture of the solid electrolyte powder and the electrode active substance powder dispersed in the insulating elastomer may further contain a rosin-based, aromatic compound-based or terpene-based tackifier such as a modified rosin, a rosin derivative, a terpene resin, a coumarone-indene resin, a phenol-modified coumarone-indene resin or the like.

The collective electrode which can be used in combination with the Structures I and II of this invention may be made of any material; however, it is preferable that when the electrode sheet contains a copper compound the collective electrode is of a copper plate and when the electrode sheet contains a silver compound the collective electrode is of a silver plate in view of the adhesion between the collective electrode and the electrode sheet. However, a collective electrode of a nickel-plated or gold-plated copper plate or an alloy such as phosphor bronze may be used.

This invention is explained in more detail below referring to Examples which are merely be way of illustration and not by way of limitation. In the Examples, part and % are by weight unless otherwise specified.

EXAMPLE 1

(1) CuCl, CuI and RbCl were weighed so that the molar ratio of CuCl:CuI:RbCl became 2.5:1.5:1.

The above CuCl and CuI were separately recrystallized in hydrochloric acid and vacuum-dried in a desicator containing P$_2$O$_5$ as a desicant. On the other hand, the above RbCl was vacuum-dried at 100° C. These salts were mixed in the predetermined amounts and completely dehydrated by heating at 130° C. for 7 hours. The salt mixture thus obtained was vacuum-sealed in a Pyrex glass tube, melted and then cooled gradually to room temperature. The salt mixture thus solidified was well ground in a ball mill using toluene as a dispersing agent, and the powder thus obtained was press-molded. The molded product thus obtained was treated in N$_2$ at 130° C. for about 17 hours, and then ground again in a ball mill to obtain a solid electrolyte powder consisting of RbCu$_4$I$_{1.5}$Cl$_{3.5}$ having a specific gravity of 4.5 which passed through a 200-mesh (Tyler) screen.

(2) An elastomer solution was prepared by dissolving 1 part of a styrene-butadiene-styrene block copolymer having a specific gravity of 0.96 (TR-2000 manufactured by Japan Synthetic Rubber Co., Ltd.) as an insulating elastomer in toluene, and thereto was added 4.2 parts of the solid electrolyte powder consisting of RbCu$_4$I$_{1.5}$Cl$_{3.5}$ obtained in (1) above, and the resulting mixture was kneaded in a ball mill for 2 hours. The mixture thus obtained was rolled by an applicator bar on a Teflon sheet and the toluene was removed by vaporization in dry air to obtain a solid electrolyte sheet having a solid electrolyte powder volume fraction of 90% and having a thickness of 20 $\mu$m (SE Sheet I).

(3) Cu powder and Cu$_2$S powder as electrode active substance powder were mixed with the solid electrolyte powder consisting of RbCu$_4$I$_{1.5}$Cl$_{3.5}$ obtained in (1) above in a weight ratio of Cu:Cu$_2$S:RbCu$_4$I$_{1.5}$Cl$_{3.5}$ = 2.9:2.7:1, and the resulting mixture was press-molded into pellets. The pellets thus obtained were vacuum-sealed in a glass tube, heated at 200° C. for 17 hours, and then ground into powder which passed through a 200-mesh (Tyler) screen to obtain a negative electrode powder. This negative electrode powder was kneaded with the above-mentioned styrene-butadiene-styrene block copolymer in the same manner as in (1) above, and the resulting mixture was molded in the same manner as in (1) above to obtain a negative electrode sheet having a negative electrode powder volume fraction of 90% and having a thickness of 45 $\mu$m (Negative Electrode Sheet I).

(4) Cu powder and TiS$_2$ powder as electrode active substance powder were mixed in a molar ratio of 0.15:1 and the resulting mixture was press-molded into pellets. The pellets thus obtained were vacuum-sealed in a quartz tube and heated at 550° C. for 72 hours. The $Cu_{0.15}TiS_2$ pellets thus obtained were ground to particles which passed through a 200-mesh (Tyler) screen, and the powder thus obtained was mixed with the solid electrolyte powder consisting of $RbCu_4I_{1.5}Cu_{3.5}$ obtained in (1) above in a weight ratio of 1:1, to obtain a positive electrode powder. This positive electrode powder was kneaded with the above-mentioned styrene-butadiene-styrene block copolymer in the same manner as in (1) above and the resulting mixture was molded in the same manner as in (1) above to obtain a positive electrode sheet having a positive electrode powder volume fraction of 90% and having a thickness of 45 μm (Positive Electrode Sheet I).

(5) The positive Electrode Sheet I obtained in (4) above, the SE Sheet I obtained in (2) above and the Negative Electrode I obtained in (3) above were laminated in this order and the resulting laminate (Structure I) was sandwiched in between two thin copper plates as collective electrodes, after which the resulting assembly was press-molded at 130° C., and the peripheral portion thereof was sealed with an epoxy resin to prepare a solid electrolyte cell.

FIG. 1 shows a cross section of the cell thus obtained which has Structure I of this invention. In FIG. 1, 1 refers to the SE Sheet I, 2 to the Positive Electrode Sheet I, 3 to the Negative Electrode Sheet I, 4 and 5 to collective electrodes and 6 to the sealing material. The thickness, total conductivity, self-discharge characteristic, charge-discharge cycle and low-temperature characteristic of the solid electrolyte cell obtained by tests are shown in Table 1.

The total conductivity (s/cm) was determined from the direct current component of the impedance at an alternative current of 1 KHz measured by a LCR meter (YHP 4274A manufactured by Yokokawa Hewlett-Packard Company).

The self-discharge characteristic was determined from the change of cell voltage at a charge-discharge cycle of 4 mAh/cc (discharge for 2 hours and charge for 1 hour).

The charge-discharge cycle is indicated by the number of cycles at which the discharge voltage became not more than 0.35 V at a charge-discharge cycle of 2.5 mAh/cc.

The low-temperature characteristic was indicated by the charge-discharge cycle at −10° C.

EXAMPLE 2

(1) Negative electrode sheet (Negative Electrode Sheet I-A, I-B and I-C) were prepared by repeating the same procedure as in Example 1(3), except that the Cu powder and $Cu_2S$ powder as electrode active substance powders and the solid electrolyte powder consisting of $RbCu_4I_{1.5}Cl_{3.5}$ obtained in Example 1(1) were used in a weight ratio of $Cu:Cu_2S:RbCu_4I_{1.5}Cl_{3.5}=3:2:3$ (Negative Electrode Sheet I-A, thickness: 20 μm), 3:2:2 (Negative Electrode Sheet I-B, thickness: 30 μm) or 3:2:1 (Negative Electrode Sheet I-C, thickness: 30 μm).

(2) Positive electrode sheets (Positive Electrode Sheets I-E, I-F and I-G) were prepared by repeating the same procedure as in Example 1(4), except that the weight ratio of $Cu_{0.15}TiS_2:RbCu_4I_{1.5}Cl_{3.5}$ was changed to 1:3 (Positive Electrode Sheet I-D, thickness: 20 μm), 1:2 (Positive Electrode Sheet I-E, thickness: 30 μm) or 1:1 (Positive Electrode Sheet I-F, thickness: 30 μm).

(3) The same procedure as in Example 1(5) was repeated, except that Positive Electrodes I-D, I-E and I-F obtained in (2) above, SE Sheet I (thickness: 20 μm) obtained in Example 1(2), Negative Electrode Sheets I-A, I-B and I-C obtained in (1) above were laminated in the order of Sheet I-F/Sheet I-E/Sheet I-D/Sheet I/Sheet I-A/Sheet I-B/Sheet I-C and thin copper plates were used as collective electrodes, to prepare a solid electrolyte cell. FIG. 2 shows a cross section of the cell thus obtained which has Structure I of this invention. In FIG. 2, 1 refers to SE Sheet I, 2 to Positive Electrode Sheet I-D, 2b to Positive Electrode Sheet I-E, 2c to Positive Electrode Sheet I-F, 3a to Negative Electrode Sheet I-A, 3b to Negative Electrode Sheet I-B, 3c to Negative Electrode Sheet I-C, 4 and 5 to collective electrodes and 6 to sealing material. The thus obtained cell was subjected to the same tests as in Example 1(5) to obtain the results shown in Table 1.

TABLE 1

|  | Example 1 | Example 2 |
| --- | --- | --- |
| Thickness of cell (mm) | 0.21 | 0.28 |
| Total conductivity (s/cm) | $5 \times 10^{-4}$ | $1.0 \times 10^{-3}$ |
| Self-discharge characteristic | No change at 100 cycles | No change at 100 cycles |
| Charge-discharge cycle (room temp.) | 2,000 cycles | 4,000 cycles |
| Charge-discharge cycle (−10° C.) | 2,000 cycles | 4,000 cycles |

EXAMPLE 3

(1) In toluene was dissolved 1 part of a styrene-butadiene-styrene block copolymer (the insulating high polymeric elastomer) to prepare a high polymer solution, and thereto was added 4.22 parts of the solid electrolyte powder consisting of $RbCu_4I_{1.5}Cl_{3.5}$ obtained in Example 1(1) (specific gravity: 4.5), and the resulting mixture was kneaded in a ball mill for 2 hours. The mixture thus obtained was placed in a polyethylene container, and the solids concentration was adjusted to 79%. In the mixture in the container was immersed a nylon woven fabric having a thickness of 50 μm, an average area per one opening of $5.5 \times 10^{-3}$ mm$^2$ and a distance between the adjacent openings of 50 μm to attach the mixture sufficiently to the surface of the woven fabric, after which the woven fabric surface was pinched by fluororubber blades and then drawn through between the blades while applying a sufficient force to the blades to fill the openings of the woven fabric with the mixture. The sheet thus obtained was dried sufficiently in a nitrogen stream to remove the toluene, thereby obtaining a solid electrolyte sheet having a thickness of 70 μm and a solid electrolyte powder volume fraction of 90% (SE Sheet II).

(2) The same procedure as in Example 1(3) was repeated to obtain a negative electrode sheet having a thickness of 70 μm (Negative Electrode Sheet I).

(3) The same procedure as in Example 1(4) was repeated to obtain a positive electrode sheet having a thickness of 70 μm (Positive Electrode Sheet I).

(4) Positive Electrode Sheet I obtained in (3) above, SE Sheet II obtained in (1) above and Negative Electrode Sheet I obtained in (2) above were laminated in this order and the resulting laminate (Structure II) was sandwiched in between two thin copper plates as collective electrodes. The resulting assembly was subjected to press-molding at 130° C. and then the peripheral portion thereof was sealed with an epoxy resin to prepare a solid electrolyte cell.

The thickness and total conductivity of the solid electrolyte cell and the results of tests for self-discharge characteristic, charge-discharge cycle, low-temperature characteristic and open circuit voltage which is the voltage obtained by allowing current to flow through Structure II are shown in Table 2.

Moreover, the bending resistance of Structure II was also evaluated to obtain the results shown in Table 2.

The total conductivity (s/cm), the self-discharge characteristic, the charge-discharge cycle and the low-temperature characteristic were determined in the same manner as in Example 1(5).

The bending resistance was evaluated by a bending test in which the sample of Structure II was repeatedly bent along the periphery of a pipe having a radius of 80 mm and determining the number of repetitions of bending at which crack or breakage occurred.

EXAMPLE 4

(1) Negative electrode sheets (Negative Electrode Sheets I-G, I-H and I-I) were prepared by repeating the same procedure as in Example 1(3), except that the weight ratio of $Cu:Cu_2S:RbCu_4I_{1.5}Cl_{3.5}$ was changed to 2.9:2.7:3 (Negative Electrode Sheet I-G, thickness: 30 μm), 2.9:2.7:2 (Negative Electrode Sheet I-H, thickness: 30 μm) or 2.9:2.7:1 (Negative Electrode Sheet I-I, thickness: 30 μm).

(2) Positive electrode sheets (Positive Electrode Sheets I-D, I-E and I-F) were prepared by repeating the same procedure as in Example 1(4), except that the weight ratio of $Cu_{0.15}TiS_2:RbCu_4I_{1.5}Cl_{3.5}$ was changed to 1:3 (Positive Electrode Sheet I-D, thickness: 30 μm), 1:2 (Positive Electrode Sheet I-E, thickness: 30 μm) or 1:1 (Positive Electrode Sheet I-F, thickness: 30 μm).

(3) A solid electrolyte cell was prepared in the same manner as in Example 1(5), except that Positive Electrode Sheet I-F obtained in (2) above, Positive Electrode Sheet I-E obtained in (2) above, Positive Electrode Sheet I-D obtained in (2) above, SE Sheet II (thickness: 70 μm) obtained in Example 3(1), Negative Electrode Sheet I-G obtained in (1) above, Negative Electrode Sheet I-H obtained in (1) above and Negative electrode Sheet I-I obtained in (1) above were laminated in this order and the resulting laminate was sandwiched in between two thin copper plate as collective electrodes. The cell thus obtained was subjected to the same tests as in Example 3(5) to obtain the results shown in Table 2.

TABLE 2

|  | Example 3 | Example 4 |
| --- | --- | --- |
| Thickness of cell (mm) | 0.31 | 0.35 |
| Total conductivity (s/cm) | $5 \times 10^{-4}$ | $1 \times 10^{-3}$ |
| Self-discharging characteristic | No change at 1000 cycles | No change at 1000 cycles |
| Charge-discharge cycle (room temp.) | 2000 cycles | 4000 cycles |
| Charge-discharge cycle (−10° C.) | 2000 cycles | 4000 cycles |
| Open circuit voltage (V) | 0.55 | 0.57 |
| Bending resistance | $6 \times 10^5$ | $4.5 \times 10^5$ |

EXAMPLE 5

(1) A solid electrolyte powder consisting of $RbCu_4I_{1.75}Cl_{3.25}$ was prepared in the same manner as in Example 1(1), except that CuCl, CuI and RbCl were used in a molar ratio of CuCl:CuI:RbCl=3.3:2.6:1.5, and the same procedure as in Example 3(1) was repeated, except that the above solid electrolyte powder was substituted for the solid electrolyte powder used in Example 3(1) and a styrene-ethylene-butylene-styrene block copolymer (Kraton G-1650, manufactured by Shell) was substituted for the insulating high polymeric elastomer, to prepare a solid electrolyte sheet having a thickness of 80 μm and comprising a nylon woven fabric, the openings of which were filled with the mixture having a solid electrolyte powder volume fraction of 90% (SE Sheet II).

(2) The same procedure as in Example 1(2) was repeated, except that a mixture of powder of copper Chevrel represented by the formula, $Cu_2Mo_6S_{7.8}$ (average particle diameter: 2 μm) as an electrode active substance powder and the solid electrolyte powder consisting of $RbCu_4I_{1.75}Cl_{3.25}$ obtained in (1) above as a solid electrolyte powder in a weight ratio of 1:1 and a styrene-ethylene-butylene-styrene block copolymer were substituted for the solid electrolyte powder and the insulating elastomer, respectively, to prepare an electrode sheet having a thickness of 100 μm and having an electrode active substance powder-solid electrolyte power volume fraction of 90% (Electrode Sheet I).

(3) Two sheets of Electrode Sheet I obtained in (2) above and SE Sheet II obtained in (1) above were laminated in the order of Electrode Sheet I/SE Sheet II/Electrode Sheet I, and the resulting laminate was sandwiched in between two stainless steel plates having a thickness of 10 μm as collective electrodes, after which the resulting assembly was press-molded at 130° C. and the peripheral portion thereof was sealed with an epoxy resin, to obtain a solid electrolyte cell.

The cell thus obtained was subjected to the same tests as in Example 3(5) to obtain the results shown in Table 3.

EXAMPLE 6

(1) The same procedure as in Example 1(2) was repeated, except that the solid electrolyte powder consisting of $RbCu_4I_{1.75}Cl_{3.25}$ obtained in Example 5(1) and a styrene-ethylene-butylene-styrene block copolymer were substituted for the solid electrolyte powder and the insulating high polymeric elastomer, respectively, to prepare a solid electrolyte sheet having a thickness of 65 μm and a solid electrolyte powder volume fraction of 85% (SE Sheet I).

(2) The same procedure as in Example 3(1) was repeated, except that a mixture of powder of copper Chevrel represented by the formula, $Cu_2Mo_6S_{7.8}$ (average particle diameter: 2 μm) as an electrode active substance powder and the solid electrolyte powder consisting of $RbCu_4I_{1.75}Cl_{3.25}$ obtained in Example 5(1) in a weight ratio of 1:1 was substituted for the solid electrolyte powder and a polypropylene nonwoven fabric having a weight per unit area of 10 g/m² was substituted for the reticulate material sheet, to prepare a positive electrode sheet having an electrode active substance powder-solid electrolyte powder volume fraction of 95% and a thickness of 100 μm (Positive Electrode Sheet II).

(3) The same procedure as in (2) above was repeated, except that powder of copper Shevrel represented by the formula, $Cu_4Mo_6S_8$ (average particle diameter: 2 μm) was substituted for the electrode active substance powder, to prepare a negative electrode sheet having a thickness of 100 μm and an electrode active substance powder-solid electrolyte powder volume fraction of 95% (Negative Electrode Sheet II).

(4) A solid electrolyte cell was prepared by laminating Positive Electrode Sheet II obtained in (2) above, SE Sheet I obtained in (1) above and Negative Electrode Sheet II obtained in (3) above in this order, sandwiching the resulting laminate in between a stainless steel plate having a thickness of 10 μm on the positive electrode side and a copper plate having a thickness of 10 μm on the negative electrode side, press-molding the resulting assembly at 130° C. and sealing the peripheral portion thereof with an epoxy resin. The solid electrolyte cell thus obtained was subjected to the same tests as in Example 3(5) to obtain the results shown in Table 3.

EXAMPLE 7

(1) The same procedure as in Example 1(2) was repeated, except that a styrene-ethylene-butylene-styrene block copolymer was substituted for the insulating high polymeric elastomer, to prepare a solid electrolyte sheet having a thickness of 55 μm and a solid electrolyte powder volume fraction of 75% (SE Sheet I).

(2) The same procedure as in Example 3(1) was repeated, except that a styrene-ethylene-butylene-styrene block copolymer was substituted for the insulating high polymeric elastomer and a woven fabric consisting of activated carbon fibers having a thickness of 200 μm (specific surface area: 900 m²/g), which is a conductive reticulate material sheet capable of acting as an electrode active substance, too, was substituted for the reticulate material sheet, to prepare an electrode sheet having a thickness of 250 μm and a solid electrolyte powder volume fraction of 90% (Electrode Sheet II).

(3) Electrode Sheet II obtained in (2) above, SE Sheet I obtained in (1) above and Electrode Sheet II obtained in (2) above were laminated in this order, and the resulting laminate was sandwiched in between two stainless steel plates having a thickness of 10 μm as collective electrodes, after which the resulting assembly was press-molded at 130° C. and the peripheral portion thereof was sealed with an epoxy resin, thereby preparing an electric double layer capacitor having the same cross section as shown in FIG. 1. The electric double layer capacitor thus obtained was subjected to the same tests as in Example 3(5) to obtain the results shown in Table 3, provided that the self-discharge characteristic was measured at a discharge time of 1/20 of that in the case of the cell and the charge-discharge cycle was determined at 0.125 mAh/cc which is also 1/20 of that in the case of the cell.

EXAMPLE 8

(1) The same procedure as in Example 1(2) was repeated to prepare a solid electrolyte sheet having a thickness of 55 μm and a solid electrolyte powder volume fraction of 70%.

(2) The same procedure as in Example 7(2) was repeated, except that a styrene-butadiene-styrene block copolymer was substituted for the insulating elastomer, to prepare an electrode sheet having a thickness of 250 μm and a solid electrolyte powder volume fraction of 20% (Positive Electrode Sheet II).

(3) In the same manner as in Example 3(1), the openings of a 200-mesh copper net having a thickness of 100 μm were filled with a mixture of a styrene-butadiene-styrene block copolymer and a combination of powder of copper Shevrel represented by the formula $Cu_4Mo_6S_8$ (average particle diameter: 2 μm) as an electrode active substance powder and the solid electrolyte powder consisting of $RbCu_4I_{1.5}Cl_{3.5}$ obtained in Example 1(1) in a weight ratio of 1:1, to prepare a negative electrode sheet having a thickness of 110 μm and a solid electrolyte powder-copper Shevrel powder volume fraction of 95% (Negative Electrode Sheet II).

(4) Two sheets of Positive Electrode Sheet II obtained in (2) above, SE Sheet I obtained in (1) above and Negative Electrode Sheet II obtained in (3) above were laminated in this order and the resulting laminate was sandwiched in between a stainless steel plate having a thickness of 10 μm on the positive electrode side and a brass plate having a thickness of 10 μm on the negative electrode side as collective electrodes, after which the resulting assembly was press-molded at 130° C. and the peripheral portion thereof was sealed with an epoxy resin, thereby preparing an electric double layer capacitor. The electric double layer capacitor thus obtained was subjected to the same tests as in Example 3(5) to obtain the results shown in Table 3, provided that the self-discharge characteristic was measured at charge and discharge times of 1/5 of those in the case of the cell and at 0.8 mAh/cc. The charge-discharge cycle was determined at 0.5 mAh/cc which is also 1/5 of that in the case of the cell.

EXAMPLE 9

(1) The same procedure as in Example 3(1) was repeated, except that powder of an $H^+$ ion-conductive solid electrolyte represented by the formula, $H_3Mo_{12}PO_{40}.29H_2O$ having an average particle diameter of 10 μm was substituted for the solid electrolyte powder, to prepare a nylon woven fabric-containing solid electrolyte sheet having a thickness of 80 μm and a solid electrolyte powder volume fraction of 90% (SE Sheet II).

(2) The same procedure as in Example 7(2) was repeated, except that $H_3Mo_{12}PO_{40}.29H_2O$ and a styrene-butadiene-styrene block copolymer were substituted for the solid electrolyte powder and the insulating elastomer, respectively, to prepare an electrode sheet having a thickness of 250 μm and a solid electrolyte powder volume fraction of 20% (Opposite Electrode Sheet II).

(3) Tungsten trioxide ($WO_3$) powder having an average particle diameter of 8 μm as an electrode active substance powder and a solid electrolyte powder consisting of $H_3Mo_{12}PO_{40}.29H_2O$ were used in a weight ratio of 1:1 and mixed with a styrene-butadiene-styrene block copolymer in the same manner as in Example 1(2), and the mixture thus obtained was subjected to the same procedure as in Example 1(2) to prepare an electrode sheet having a thickness of 80 μm and a solid electrolyte powder-$WO_3$ powder volume fraction of 85% (Display Electrode Sheet I).

(4) Display Electrode Sheet I obtained in (3) above, SE Sheet II obtained in (1) above and Opposite Electrode Sheet I obtained in (2) above were laminated in this order and the laminate thus obtained was sandwiched in between a polyester sheet having a thickness of 50 μm having provided thereon an ITO transparent electrode having a thickness of 0.3 μm on the display electrode side and a stainless steel plate having a thickness of 10 μm on the opposite electrode side, after which the assembly thus obtained was press-molded at 80° C. and the peripheral portion thereof was sealed with an epoxy resin, thereby obtaining an electrochromic display element having a structure of the same cross section as shown in FIG. 1. The element thus obtained was subjected to the same tests as in Example 3(5) to obtain the results shown in Table 3. Also, the element was subjected to a coloration-discoloration cycle test at 20 millicoulombs (mC) per unit area of element to obtain substantially the same characteristics as at the initial even when the number of cycles exceeded $10^5$.

TABLE 3

|  | Example | | | | |
|---|---|---|---|---|---|
|  | 5 | 6 | 7 | 8 | 9 |
| Element thickness (mm) | 0.26 | 0.24 | 0.50 | 0.58 | 0.38 |
| Total conductivity (s/cm) | $6 \times 10^{-4}$ | $8 \times 10^{-4}$ | $2 \times 10^{-4}$ | $3 \times 10^{-4}$ | $2 \times 10^{-3}$ |
| Self-discharge characteristic | No change for 1000 cycles | No change for 1000 cycles | No change for 1000 cycles | No change for 1000 cycles | No change for 1000 cycles |
| Charge-discharge cycle (room temp.) | 4000 cycles | 4500 cycles | 10000 cycles | 5000 cycles | — |
| Charge-discharge cycle ($-10°$ C.) | 4000 cycles | 4500 cycles | 10000 cycles | 5000 cycles | — |
| Open circuit voltage during charging (V) | 0.55 | 0.55 | 1.0 | 0.58 | — |
| Bending resistance (repetions) | $1 \times 10^6$ | $8.5 \times 10^5$ | $3 \times 10^5$ | $.4 \times 10^5$ | $5 \times 10^5$ |

What is claimed is:

1. A structure comprising a pair of electrode sheets and an electrolyte sheet, said electrolyte sheet being sandwiched in between the pair of electrode sheets, wherein each of the pair of electrode sheets is composed of a mixture comprising an insulating elastomer and an electrode active substance powder alone or in combination with an inorganic solid electrolyte powder, in which mixture the electrode active substance powder or the combination thereof with an inorganic solid electrolyte powder is dispersed in a volume fraction of 75–95% in the insulating elastomer, and said electrolyte sheet is composed of a mixture comprising an insulating elastomer and an inorganic solid electrolyte powder, in which mixture the inorganic solid electrolyte powder is dispersed in a volume fraction of 55–95% in the insulating elastomer.

2. The structure according to claim 1, wherein each of the electrode sheets is a laminate of a plurality of layers of mixtures of the electrode active substance powder and the inorganic solid electrolyte powder at different mixing ratios which are varied stepwise, said layers of the mixture being arranged in the order of the mixing ratios, and the laminate layer having the highest mixing ratio of the inorganic electrolyte powder is in contact with the electrolyte sheet.

3. The structure according to claim 1, wherein the inorganic solid electrolyte powder is a $Li^+$ ion-conductive solid electrolyte powder, a $Ag^+$ ion-conductive electrolyte powder, a $Cu^+$ ion-conductive electrolyte powder, a $H^+$ ion-conductive electrolyte powder or a $Na^+$ ion-conductive electrolyte powder.

4. The structure according to claim 3, wherein the inorganic solid electrolyte powder is a $Cu^+$ ion-conductive electrolyte powder.

5. The structure according to claim 4, wherein the $Cu^+$ ion-conductive electrolyte powder is represented by the formula, $RbCu_4I_{2-x}Cl_{3-x}$ in which x is an arbitrary number of 0.2–0.6.

6. The structure according to claim 1, wherein the electrode active substance powder is at least one member selected from the group consisting of carbonaceous materials, metal sulfides, metal oxides, metal halides and metals.

7. The structure according to claim 1, wherein the electrode active powder and the inorganic solid electrolyte powder can pass through a 200-mesh (Tyler) screen.

8. A solid electrolyte cell comprising the structure of claim 1.

9. A structure comprising a pair of electrode sheets and an electrolyte sheet, the electrolyte sheet being sandwiched in between the pair of electrode sheets, wherein at least one sheet selected from the electrolyte sheet and the electrode sheets comprises a reticulate material sheet, at least the openings of which are filled with a mixture comprising an insulating elastomer and at least one member selected from the group consisting of an electrode active substance powder and an inorganic solid electrolyte powder, provided that in the case of the electrolyte sheet, said reticulate material sheet is nonconductive and said mixture is free of the electrode active substance powder, in which mixture said at least one member is dispersed in the insulating elastomer; when said electrolyte sheet is free of the reticulate material sheet, the electrolyte sheet is composed of a mixture of comprising an insulating elastomer and an inorganic solid electrolyte powder in which mixture the electrolyte powder is dispersed in the insulating elastomer; and when said electrode sheet is free of the reticulate material sheet, the electrode sheet is composed of a mixture comprising an insulating elastomer and an electrode active substance powder alone or in combination with an inorganic solide electrolyte powder in which mixture the electrode active substance powder alone or in combination with an inorganic electrolyte powder is dispersed in the insulating elastomer.

10. The structure according to claim 9, wherein in the mixture comprising the inorganic solid electrolyte powder and the insulating elastomer, the inorganic solid electrolyte powder is dispersed in a volume fraction of 55–95% in the insulating elastomer.

11. The structure according to claim 9, wherein in the mixture comprising the insulating elastomer and the electrode active substance powder alone or in combination with the inorganic solid electrolyte powder, the electrode active substance powder or the combination thereof with the inorganic solid electrolyte powder is dispersed in a volume fraction of 55–95% in the insulating elastomer.

12. The structure according to claim 9, wherein the reticulate material sheet in the electrode sheet is a conductive reticulate material sheet which can act as an electrode active substance, too, and at least the openings of the reticulate material sheet are filled with a mixture comprising the insulating elastomer and the inorganic solid electrolyte powder, in which mixture the inorganic solid electrolyte powder is dispersed in the insulating elastomer.

13. The structure according to claim 9, wherein the electrode sheet is composed of a laminate of a plurality of layers of mixtures of the electrode active substance powder and the inorganic solid electrolyte powder at different mixing ratios which are varied stepwise, the layers being arranged in the order of the mixing ratios, and the layer having the largest mixing ratio of the inorganic solid electrolyte powder is in contact with the electrolyte sheet.

14. The structure according to claim 9, wherein the inorganic solid electrolyte powder is a $Li^+$ ion-conductive solid electrolyte powder, a $Ag^+$ ion-conductive electrolyte powder, a $Cu^+$ ion-conductive electrolyte powder, a $H^+$ ion-conductive electrolyte powder or a $Na^+$ ion-conductive electrolyte powder.

15. The structure according to claim 9, wherein the inorganic solid electrolyte powder is a $Cu^+$ ion-conductive solid electrolyte powder.

16. The structure according to claim 15, wherein the $Cu^+$ ion-conductive electrolyte powder is represented by the formula, $RbCu_4I_{2-x}Cl_{3-x}$ in which x is an arbitrary number of 0.2–0.6.

17. The structure according to claim 9, wherein the electrode active substance powder is at least one member selected from the group consisting of carbonaceous materials, metal sulfides, metal oxides, metal halides and metals.

18. A solid electrolyte cell, solid electric double layer capacitor or solid electrochromic display comprising the structure of claim 9.

* * * * *